Oct. 17, 1950 W. K. LEWIS 2,526,474
METHOD OF MELTING AND PURIFYING IMPURE METAL POWDER
Original Filed June 2, 1947 3 Sheets-Sheet 1

Warren K. Lewis Inventor
By J. Cashman Attorney

Patented Oct. 17, 1950

2,526,474

UNITED STATES PATENT OFFICE 2,526,474

METHOD OF MELTING AND PURIFYING IMPURE METAL POWDER

Warren K. Lewis, Newton, Mass., assignor to Standard Oil Development Company, a corporation of Delaware Original application June 2, 1947, Serial No. 751,779. Divided and this application April 1, 1948, Serial No. 18,442

4 Claims. (Cl. 75—43)

This application is a division of my co-pending application Serial No. 751,779, filed June 2, 1947.

This invention is directed to a method for purifying iron, and particularly for purifying powdered iron mixed with impurities.

By recently developed technique iron ore is reduced by suspending it in powdered form in a reducing gas. The product of this operation is powdered iron mixed with impurities which are not reducible by the reducing gas. These impurities can only be removed effectively by melting both metal and impurities (usually using slagging agents such as calcium oxide) and separating the immiscible liquids. The melting of the powdered iron has proven extraordinarily difficult from a practical point of view due to its going through a plastic condition before melting, which results in balling up. Moreover, the powdered iron is very susceptible to oxidation.

A conventional method for melting iron for purification is to use an open hearth furnace. If it is attempted to use such a furnace for powdered iron the powdered iron has a tendency to float on the surface of the slag layer where it is exposed to the combustion gases which, if they are the result of efficient combustion, contain substantial quantities of $CO_2$. Gases of this composition at the operating temperature of the open hearth furnace immediately burn up the powdered iron and render the whole operation impossible. Pure iron requires a temperature between about 1500° and 1600° C. for melting and at this temperature it can tolerate only a very small percentage of $CO_2$ in the heating gas where the latter comes in direct contact with the iron. This temperature can, of course, be reduced by mixing carbon with the iron. Suitable quantities of carbon will reduce the melting point of the iron to about 1100° C. At this temperature iron can tolerate considerably more carbon dioxide or other oxidizing gas in contact with it than at higher temperatures. However, at these temperatures carbon has practically no tolerance for oxidizing gases with the result that if there is any substantial content of $CO_2$ or other oxidizing gas in the hot gases contacting the ore the carbon will burn out and the iron will solidify or freeze unless its temperature is above its melting point.

It is the principal object of the present invention to provide a method by which iron powder can be readily melted for purification without having the iron powder come in contact with any gases of excessive oxidizing powder.

Another object of the present invention is the provision of a method in which high velocity of heating gas to get high heat release per unit volume may be employed without incurring the risk of blowing the iron powder out of the furnace.

A more specific object of the present invention is the provision of a method in which impure powdered metal is continuously fed to a layer of molten slag overlying a layer of molten metal, molten material is continuously withdrawn from the melt, heated with a rapidly flowing heating gas and returned to the melt to carry heat into the smelting operation.

Further objects and advantages of the present invention will appear from the following detailed description of the accompanying drawing, in which:

Fig. 5 is a cross section along the line C—C of Fig. 1.

Figures 1, 2:
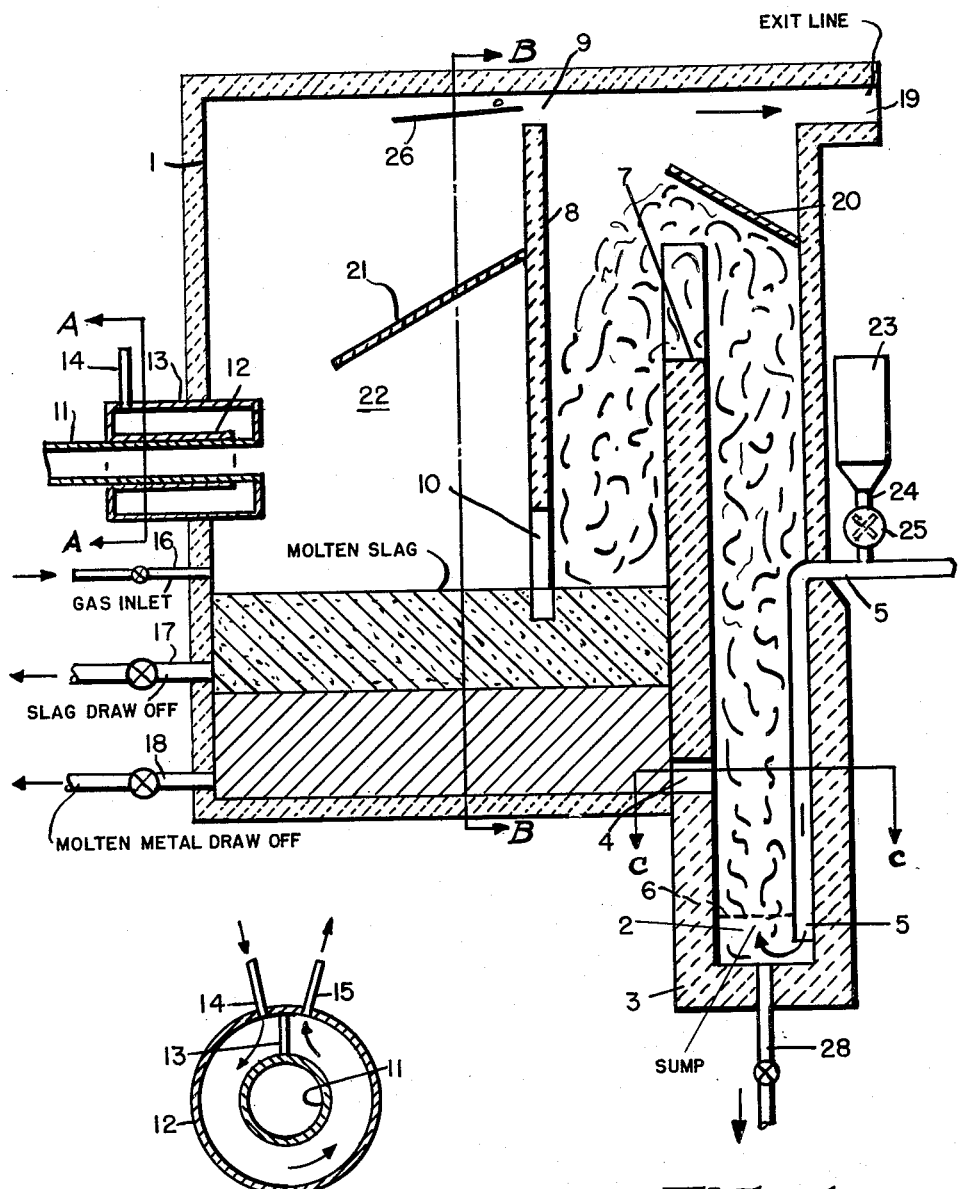
Fig. 1 is a vertical longitudinal section of one embodiment of an apparatus according to the present invention.
Fig. 2 is an enlarged cross-section along the line A—A of Fig. 1.

Referring to Fig. 1, numeral 1 designates a furnace which can assume any desired configuration. It will be understood that details such as fire brick lining, supports for partitions, wall cooling, and the like are omitted in order more simply to illustrate the principle of the present invention.

On one side the furnace is provided with a sump 2 the defining wall 3 of which extends well up into the furnace. This sump provides the submergence for a gas lift and its dimensions must be selected accordingly. Wall 3 has an opening 4 near the floor of the furnace to permit molten material to run from the floor of the furnace into the sump. On the furnace wall side of the sump is an inlet duct 5 terminating near the bottom of the sump below a perforated distributing plate 6. The wall 3 on its inner face has at its upper end a cutaway portion defining a wier or spilling 7 over which molten material from the sump flows into the furnace proper.

Extending transversely across the furnace spaced from the wall 3 of the sump and also from the floor of the furnace is a vertical baffle 8 having an opening 9 at its upper end. The lower edge of the baffle 8 is located to be below the surface of the molten slag layer when the furnace is in operation. Preferably, for the reason hereinafter given, the lower edge of baffle 8 is provided with cut-out portions 10 in the form of arches, it being understood that between these arches the baffle will be supported on pillars or other suitable construction.

At an intermediate point in the furnace wall remote from the sump and on the opposite side of baffle 8 therefrom is inlet line 11 for the powdered impure metal. At the point where pipe 11 is connected with the furnace it is protected by a cooling jacket 12. This jacket has a longitudinal partition 13 with inlet 14 and outlet 15 for cooling liquid arranged on its upper side on either side of the partition 13. The purpose of this jacket is to prevent the temperature in the feed pipe 11 from reaching the temperature at which the iron become plastic to thereby avoid plugging of this feed pipe. Also on the same side of the furnace is an inlet pipe 16 for heating gases, a drawoff tap 17 for slag and a drawoff tap 18 for metals.

At the upper end of the furnace is an exit line 19 for stack gases. A suitable baffle or baffles 20 are provided to insure the separation of molten metal from the stack gases before they enter the exit line. In like manner a suitable baffle or baffles 21 are provided to prevent the carry-over of powdered material from the smelting chamber, which is designated by 22, to the stack.

To assist in the control of the carbon in the molten metal and to make possible at the same time the presence of adequate carbon in the combustion zone, a hopper 23 is connected to the air line 5 by a pipe 24 provided with a star feeder or similar device 25. The carbon supply through line 5 must be limited so as not to generate excessive temperature in this line. Temperature in the line can be controlled by including powdered lime or other slagging constituents in the solid feed to this line. In order to avoid the solidification of any metal in the sump there is provided at the lower end thereof a drawoff 28. It will be understood that this drawoff or tap, as well as those designated by numerals 17 and 18, will be of the usual type employed in metallurgical furnaces. For example, they may be merely openings sealed with a plug of clay or other suitable material.

In operating the furnace described, it may be started by first being heated up by passing combustion gases through it or effecting combustion in it of gases introduced through line 5 and line 16. When the furnace is adequately heated it may be charged with a melt of iron and slag which may be separately prepared or melted in the furnace itself. Pig iron is suitable for the molten metal layer.

With the furnace heated up to a temperature between about 1100° and 1500° C., depending upon how much carbon is to be maintained in the metal, the powdered impure metal containing carbon and slag constituents is fed in through line 11. In this pipe the powdered material is maintained in aerated or fluffed condition so as to flow readily as a fluid. It will be understood that for aeration of this powder, a gas free from oxidizing components is utilized. If the combustion gases leaving through flue 19 are sufficiently low in carbon dioxide and air and oxygen, a portion of this gas may be used for aerating the powdered impure metal. Otherwise producer gas, hydrogen, nitrogen or any other inert or reducing gas may be employed for this purpose.

Upon entering the chamber 22 the powdered metal disengages from the gas and falls on the top of the slag layer. At this time molten metal is running from the lower layer into the sump and preheated air is being fed in through line 5 at a rate sufficient to lift the molten metal up on the gas lift principle into the area above the sump so that the molten metal passes over the wier 7 and drops on to the top of the slag layer. As previously pointed out, the lower end of partition 8 has openings so that the powdered metal fed on to the slag layer may float over toward the wier 7 and be dragged down through the slag layer by the molten metal passing over wier 7.

Because there is no powder entering the sump the gas velocity through the sump may be quite high, as, for example, between about 10 and 100 ft./second. When the gas fed into the sump is air only, the heat must be supplied by the burning of carbon. To this end adequate carbon is added to the charge to supply enough heat by combustion thereof and at the same time retain in the molten metal the desired percentage of carbon. The operation can be so conducted that no iron is reoxidized in the process of supplying heat. This can be accomplished by proportioning the air supply to the carbon available in the metal passed through the sump so that at the temperature of operation the carbon burns primarily to carbon monoxide. This means that the air supplied at the bottom of the sump must be not substantially in excess of the stoichiometric quantity to burn the carbon available in the recycling metal to CO, it being understood that at the temperature of operation the equilibrium between iron and oxides of carbon will permit combustion of part of the carbon up to about 20% to $CO_2$ without causing any oxidation of iron. Actually, in this type of operation the iron is heated by hot CO and inert gas.

If the furnace is receiving inadequate heat, the percentage of carbon in the feed must be increased. If too much carbon is included in the feed, it will have a tendency to collect on the slag layer and will interfere with the movement of the powdered metal down into the liquid. In this case the percentage of carbon in the feed must be reduced. This carbon percentage may be adjusted so as to provide enough carbon to supply the required heat and at the same time leave a certain percentage of carbon in the molten metal depending on what further processing of the molten metal is contemplated. When the metal withdrawn from the furnace is fed to an open hearth or other furnace for further purification, the carbon content thereof may be up to about 6%. Where substantially complete purification of the metal in the furnace shown is desired, the carbon content in the molten metal will be maintained at a lower level.

It must be understood that carbon is not the only constituent of the impure iron which may be burned in the sump to supply heat for the operation. Other impurities, such as silicon, manganese, and the like, may also be burned for this purpose. Even part of the iron itself may be burned so long as it does not constitute too large a percentage of the total charge to the furnace. When this burning operation is utilized, air fed to the furnace is preheated by the stack gases. These stack gases have high fuel and reducing values and should be utilized accordingly. For the preheating of the air these gases may be utilized in equipment such as recuperators or regenerators or other forms of heat exchangers.

It will be understood, of course, that instead of feeding air in through pipe 5 it is possible to burn fuel gases adjacent the furnace and feed in the hot combustion residue into the sump. In any case, the method and apparatus of the present invention make it possible to insure that the powdered material fed to the furnace does not come into contact with any gas containing oxidizing constituents. The system is very flexible and permits ready control of the quality of the molten iron withdrawn from the system. As previously indicated, the combustion which occurs in the sump or outside the sump may also be controlled so that the combustion gases do not have a sufficient quantity of carbon dioxide or other oxidizing constituents to oxidize any of the iron.

The type of gas lift which occurs in the sump will depend on the velocity of the gas passing through the sump. At lower velocities the gas lift will be the slug type in which spaced slugs of melt are lifted by spaced bubbles of gas. As the velocity increases the slugging action tends to disappear and to be replaced by what may be termed a creeping action in which the melt clings to the wall of the sump as a film which creeps upwardly under the influence of the rising gas. At still higher velocities this film is, in effect, shredded off of the wall of the sump and dispersed in the gas as a spray in which condition it travels upwardly. The line of demarcation between these different types of gas lift is not sharp, one type overlapping into the other type so that at any given gas velocity two types of gas lift may be occurring simultaneously.

The aerated metal powder introduced at inlet 11 should not come in at a sufficient speed to permit the carryover of metal from the chamber 22. Likewise, the carryover of metal powder or the hindrance of its settling by virtue of gases escaping from the melt during the operation should be minimized. This may readily be accomplished by manipulating a damper 26 provided for the opening 9. By suitably manipulating this damper during the operation the gases carried in with the solid metal may be forced to take the path through the archway 10, in which case they will have a tendency to carry the metal powder directly into the foam or shower of molten metal coming over partition 7. In the ordinary furnace, however, the volume of the chamber 22 is so large compared to the inlet for the powdered metal that the flow of gas through the chamber is at a very low velocity, much below the free falling velocity of the metal powder.

Figure 3:
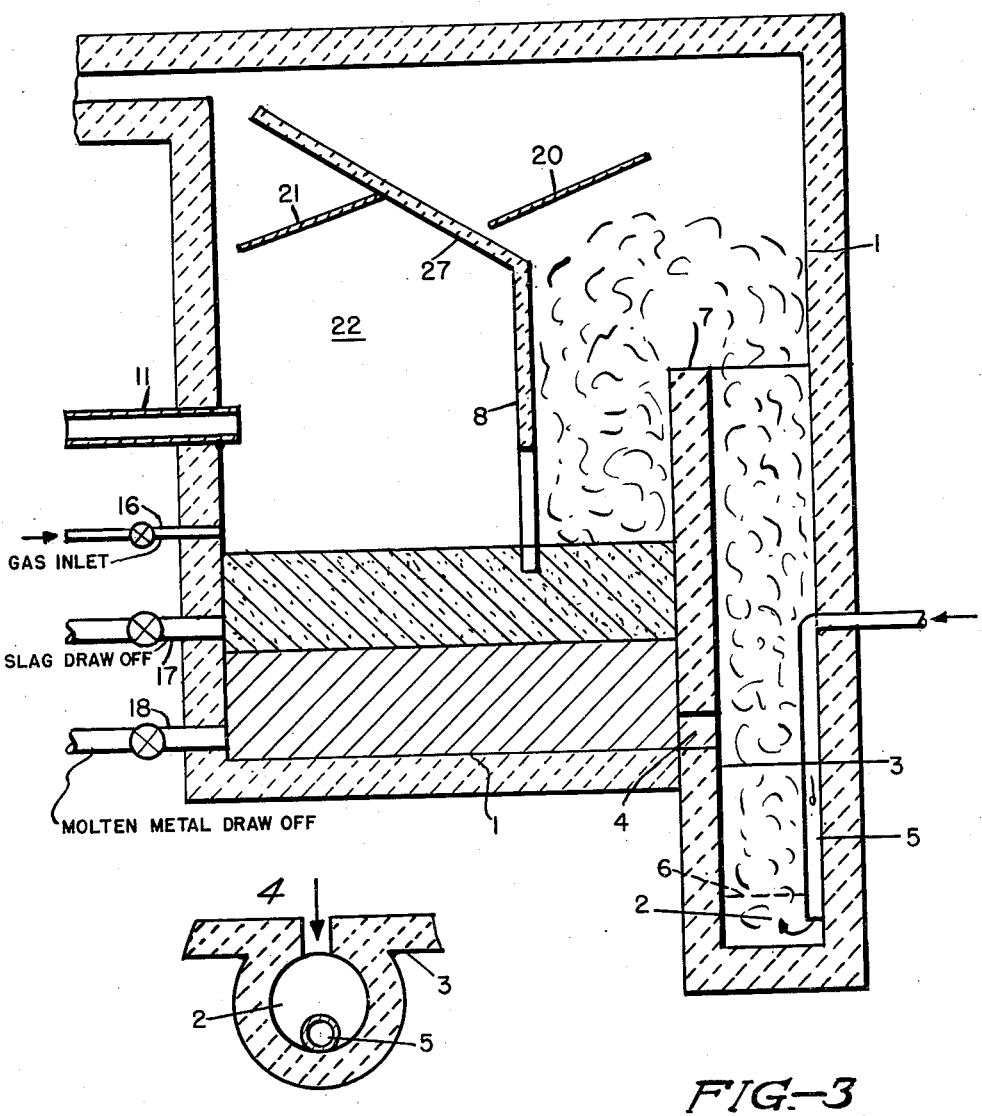
Fig. 3 is a view similar to Fig. 1 of another embodiment of the present invention.
Figure 4:
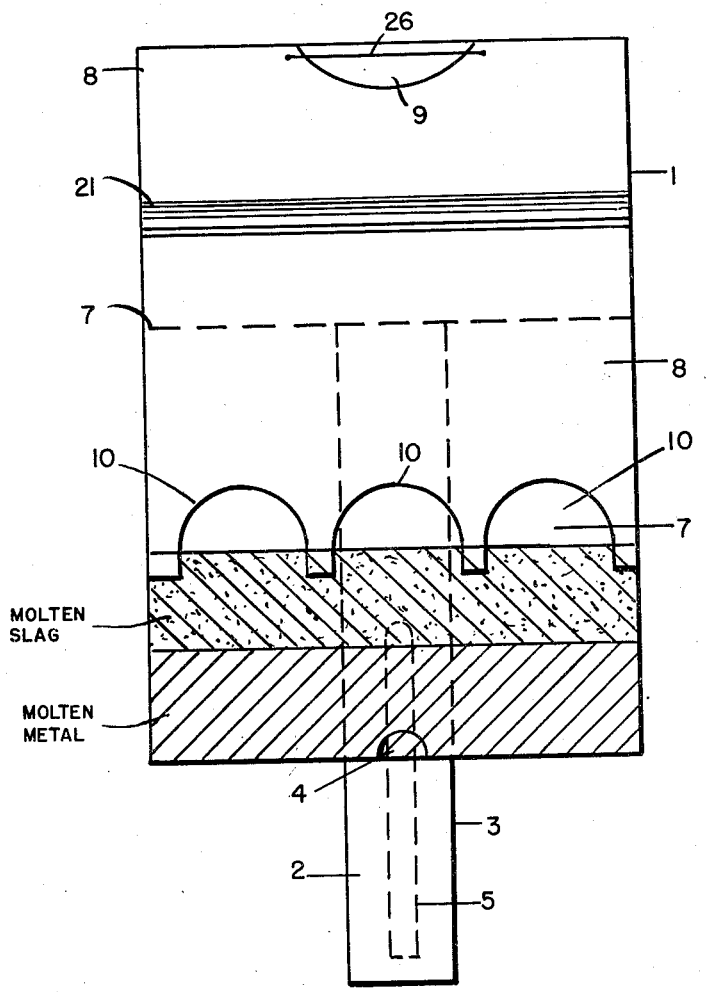
Fig. 4 is a cross section along the lines B—B of Fig. 1.

The arrangement shown in Fig. 3 is identical in all respects with the arrangement shown in Fig. 1 except for the design of the wall 8 and the location of the flue 19. In the arrangement shown in Fig. 2 the flue 19 is located on the far side of the furnace from the sump 2 and the wall 8 has its upper end inclined toward the flue, the inclined portion being designated in Fig. 3 by numeral 27. In this embodiment the baffles 20 and 21 will be somewhat differently disposed, but with regard to these baffles, it will be appreciated that they may assume many different positions and may, in fact, be omitted entirely without detracting substantially from the efficiency of the operation.

In the foregoing description reference has been made to the purification of iron. It will be appreciated that the method of operation is applicable to the purification of any impure metal powder which, like iron, is very reactive with oxidizing gases at its melting point. Examples of such metals are copper, tin, lead, and the like.

The nature and objects of the present invention having thus been set forth and specific examples of the same given, what is claimed as new and useful and desired to be secured by Letters Patent is:

1. A method for melting and purifying impure iron metal powder which comprises establishing a reservoir of molten material having a layer of molten iron and a superimposed layer of molten slag, feeding the impure metal iron powder to said molten slag layer through which it descends by gravity, continuously withdrawing a portion of the molten iron, heating said withdrawn portion of iron by burning a fuel with an oxygen-containing gas in contact with said iron under conditions controlled as to provide an atmosphere non-oxidizing with respect to said iron, to heat the same to a temperature substantially above that in said reservoir and recycling the thus heated iron to the said reservoir for the purpose of supplying substantially the entire amount of heat required for the melting and purifying of said iron powder and recovering a purified molten iron product.

2. The method set forth in claim 1 in which the powdered iron is fed to the said slag layer at a temperature below the plasticizing temperature thereof.

3. A method for melting and purifying impure iron metal powder which comprises establishing a reservoir of molten material having a layer of molten iron and a superimposed layer of molten slag, feeding the impure metal powder to said molten slag layer through which it descends by gravity, continuously withdrawing a portion of the molten iron, heating said withdrawn portion of iron by burning carbon with an oxygen-containing gas in contact with said iron under conditions controlled so as to provide an atmosphere non-oxidizing with respect to said iron to heat the same substantially to a temperature above that in said reservoir and recycling the thus heated iron to the said reservoir for the purpose of supplying substantially the entire amount of heat required for the melting and purifying of said iron powder and recovering from the process a purified molten product.

4. The method set forth in claim 3 in which the powdered iron is fed to the said slag layer at a temperature below the plasticizing temperature thereof.

WARREN K. LEWIS.

REFERENCES CITED

The following references are of record in the file of this patent:

UNITED STATES PATENTS

| Number | Name | Date |
|---|---|---|
| 629,520 | Mond | July 25, 1899 |
| 894,383 | Imbert | July 28, 1908 |
| 1,167,944 | Shuman | Jan. 11, 1916 |
| 1,535,109 | Davies | Apr. 28, 1925 |
| 1,815,946 | Langer | July 28, 1931 |
| 1,865,183 | Gaus | June 28, 1932 |
| 1,904,853 | Carter | Apr. 18, 1933 |
| 2,019,112 | Beekhuis | Oct. 29, 1935 |
| 2,055,313 | Ruthruff | Sept. 22, 1936 |
| 2,334,583 | Reeves | Nov. 16, 1943 |

FOREIGN PATENTS

| Number | Country | Date |
|---|---|---|
| 1,866 | Great Britain | of 1885 |
| 278,185 | Great Britain | Oct. 17, 1927 |